(12) United States Patent
Hsieh (10) Patent No.: US 8,854,050 B2
(45) Date of Patent: Oct. 7, 2014

(54) DETECTION METHOD OF LOW FREQUENCY HANDSHAKING SIGNAL

(75) Inventor: Jiun-Cheng Hsieh, Taipei (TW)

(73) Assignee: Genesys Logic, Inc., Shindian, Taipei (TW)

( * ) Notice: Subject to any disclaimer, the term of this patent is extended or adjusted under 35 U.S.C. 154(b) by 546 days.

(21) Appl. No.: 13/032,625

(22) Filed: Feb. 22, 2011

(65) Prior Publication Data

US 2012/0119756 A1    May 17, 2012

(30) Foreign Application Priority Data

Nov. 16, 2010   (TW) ............................... 99139427 A (51) Int. Cl.
*G01R 35/00* (2006.01)
*H04L 25/02* (2006.01)

(52) U.S. Cl.
CPC ................................. *H04L 25/0278* (2013.01)
USPC ......................................... 324/601; 710/100

(58) Field of Classification Search
USPC ............ 324/601–650, 219, 231, 354; 326/86; 375/219, 231, 354
See application file for complete search history.

(56) References Cited

U.S. PATENT DOCUMENTS

| | | | | |
|---|---|---|---|---|
| 6,636,169 B1 * | 10/2003 | Distinti et al. | ................ | 341/126 |
| 7,161,358 B1 * | 1/2007 | Tanbakuchi et al. | .......... | 324/605 |
| 7,161,388 B2 * | 1/2007 | Schoenborn et al. | ........... | 326/86 |
| 2005/0093575 A1 * | 5/2005 | Schoenborn et al. | ........... | 326/86 |
| 2005/0264300 A1 * | 12/2005 | Chang et al. | ................... | 324/601 |
| 2009/0161738 A1 * | 6/2009 | Carvalho et al. | ............... | 375/219 |
| 2010/0122021 A1 * | 5/2010 | Lee et al. | ....................... | 711/103 |

FOREIGN PATENT DOCUMENTS

| | | |
|---|---|---|
| CN | 101520767 | 9/2009 |
| CN | 101639798 | 2/2010 |

* cited by examiner

*Primary Examiner* — Arleen M Vazquez
*Assistant Examiner* — Brent J Andrews (57) ABSTRACT

A detection method of low frequency handshaking signal is described. The method includes the following steps of: (a) performing first impedance calibration when host device is activated for sending a first low frequency signal based on the first impedance calibration and performing a second impedance calibration when a controlled device is activated for sending a second low frequency signal based on the second impedance calibration; (b) transmitting a first high frequency training signal from the host device to the second receiver of the controlled device when the first low frequency signal and the second low frequency signal are in a predetermined condition; and (c) transmitting a second high frequency training signal from the controlled device to the first receiver of the host device wherein the frequency of the first low frequency signal and the second low frequency signal is smaller than the frequency of the first high frequency training signal and the second high frequency training signal.

11 Claims, 7 Drawing Sheets

DETECTION METHOD OF LOW FREQUENCY HANDSHAKING SIGNAL

CLAIM OF PRIORITY

This application claims priority to Taiwanese Patent Application No. 099139427 filed on Nov. 16, 2010.

FIELD OF THE INVENTION

The present invention relates to a signal detection method, and more particularly to a detection method of low frequency handshaking signal which is compatible to Universal Serial Bus (USB) protocol and Peripheral Component Interconnect Express (PCI-E) protocol.

BACKGROUND OF THE INVENTION

With the rapid development and progress of information technology, the consumer electronic products, such as portable storage and video/audio media, are widely used in the fields of data read/write and video image. Generally, the universal serial bus (USB) protocol is utilized as a communication bus which is served as the communication interface between the electronic product and the host unit. The USB protocol is developed from version 1.0 to version 3.0 in order to speed up the read/write process of the data stream of the electronic product. The USB 3.0 gradually becomes a standard interface for high-speed data transmission of the electronic product for increasing the access efficiency of the data.

The receiver and transmitter of the electronic product receive the information from the host unit (e.g. computer system) or transmits message to the host unit based on USB 3.0. It is necessary to detect the impedance between the host and the electronic product before the serial signal is transmitted at high-speed operation frequency. The serial signal is not transmitted until the impedance between the host and the electronic product is matched.

The impedance matching step includes that the circuit impedance if the electronic product is detected by a terminal detection circuit during the "Rx detect" stage of the electronic product. However, the architecture of the terminal detection circuit is too complicated and the manufacturing cost of the terminal impedance detection circuits of the host and the electronic product is too high. In addition, the terminal detection circuits of manufacturers are different. For example, U.S. Pat. No. 7,161,388 discloses a remote receiver detection. Although the impedance between the host and the electronic product can be detected, however, the terminal detection circuits of manufacturers are not the same, resulting in the compatibility problem so that the signal between the terminal detection circuit of manufacturers cannot be correctly transmitted. Consequently, there is a need to develop a novel detection method to solve the aforementioned problems.

SUMMARY OF THE INVENTION

The present invention provides a detection method of low frequency handshaking signal which is compatible to Universal Serial Bus (USB) protocol and Peripheral Component Interconnect Express (PCI-E) protocol. The detection method is capable of saving the manufacturing cost of the terminal impedance detection circuits of the host device and the controlled device, increasing the impedance matching compatibility between the host device and the controlled device, and reducing the power consumption when the host device communicates with the controlled device by low frequency handshaking signal.

According to the above objective, the present invention sets forth a detection method of low frequency handshaking signal which is suitable for a detection system, wherein the detection system comprises a host device having a first receiver and a first transmitter, and a controlled device having a second receiver, a second transmitter and a clock/data recovery device, the detection method comprising the steps of:

(a) performing a first impedance calibration when the host device is activated for sending a first low frequency signal based on the first impedance calibration and performing a second impedance calibration when the controlled device is activated for sending a second low frequency signal based on the second impedance calibration, wherein the first impedance calibration is independent of the second impedance calibration;

(b) transmitting a first high frequency training signal from the host device to the second receiver of the controlled device when the first low frequency signal and the second low frequency signal are in a predetermined condition; and (c) transmitting a second high frequency training signal from the controlled device to the first receiver of the host device wherein the frequency of the first low frequency signal and the second low frequency signal is smaller than the frequency of the first high frequency training signal and the second high frequency training signal.

The detection method of low frequency handshaking signal only identifies whether the receivers of the host device and the controlled device themselves and then the low frequency handshaking signal can be transmitted. In other words, it not necessary to identify whether the opposite receivers of the host device and the controlled device are ready for operation. Specifically, it is not required that the first transmitter of the host device is matched with the second receiver of the controlled device, and it is not required that the second transmitter of the controlled device is matched with the first receiver of the host device so that the low frequency handshaking signal can be transmitted. Therefore, the detection system can solves the problem of impedance matching compatibility between the host device and the controlled device. That is, if the impedance matching value of the controlled device is not the same as a standard impedance matching value the high frequency training signal still can be transmitted. Even if the impedance matching step during the "Rx Detect" stage can be omitted, impedance matching step can be performed during the transmission stage of high frequency training signal so that operation of the detection system does not be effected. Further, the manufacturing cost of the terminal impedance detection circuits of the host device and the controlled device can be saved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1A:
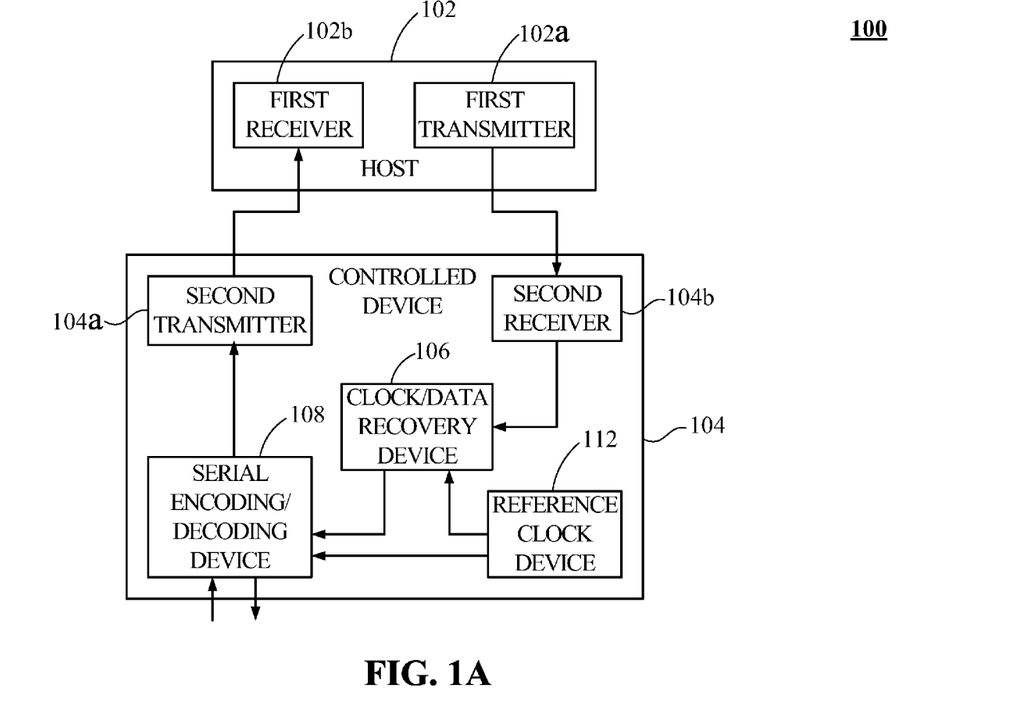
FIG. 1A is a schematic block diagram of detection system of low frequency handshaking signal according to one embodiment of the present invention.
Figure 1B:
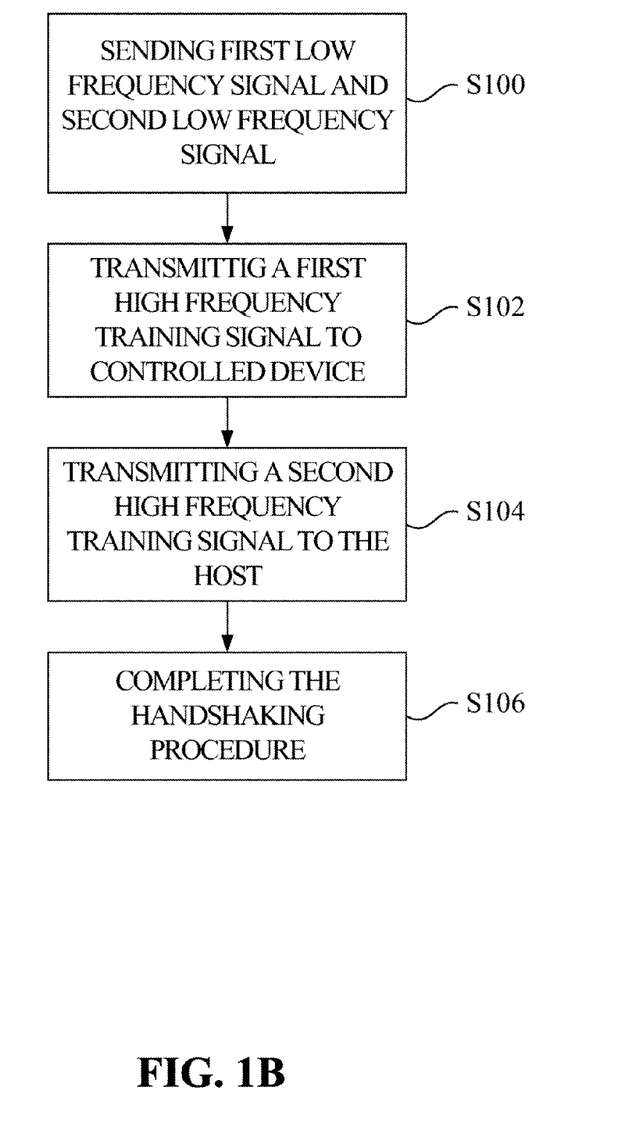
FIG. 1B is a flow chart of detection method of low frequency handshaking signal according to one embodiment of the present invention.

Please refer to FIG. 1A and FIG. 1B. FIG. 1A is a schematic block diagram of detection system 100 of low frequency handshaking signal according to one embodiment of the present invention. FIG. 1B is a flow chart of detection method of low frequency handshaking signal according to one embodiment of the present invention.

The detection method is suitable for a detection system 100 wherein the detection system 100 includes a host device 102 and a controlled device 104. The host device 102 has a first receiver 102a and a first transmitter 102b and the controlled device 104 has a second receiver 104a, a second transmitter 104b, a clock/data recovery device 106, a serial encoding and decoding device 108 and a reference clock device 112. The host device 102 is coupled to the controlled device 104 and the first receiver 102b is coupled to the second transmitter 104a. The second receiver 104b is coupled to the first transmitter 102a. The clock/data recovery device 106 is coupled to the second receiver 104b, the second transmitter 104a and the serial encoding and decoding device 108. The detection method of low frequency handshaking signal includes the following steps of:

In step S100, when the host device 102 is activated, a first impedance calibration is performed for sending a first low frequency signal based on the first impedance calibration. When the controlled device 104 is activated, a second impedance calibration is performed for sending a second low frequency signal based on the second impedance calibration, wherein the first impedance calibration is independent of the second impedance calibration. That is, the first impedance calibration represents that the first receiver 102b of the host device 102 is ready for operation and the first transmitter 102a of the host device 102 can issue the first low frequency signal. Similarly, the second impedance calibration represents that the second receiver 104b of the controlled device 104 is ready for operation and the second transmitter 104a of the controlled device 104 can issue the second low frequency signal. The first impedance calibration and the second impedance calibration are independently performed, respectively.

In step S102, when the first low frequency signal and the second low frequency signal are in a predetermined condition, the host device 102 transmits a first high frequency training signal to the second receiver 104b of the controlled device 102. In one embodiment, the predetermined condition is a signal having 16 consecutive periods issued by the transmitter, a signal having at least two consecutive periods received by the receiver, and/or a transmission signal having four consecutive periods after receiving one period signal by the receiver. For example, the first transmitter 102a transmits at least 16 consecutive period signal, the second receiver 104b receives at two period signal, and the second transmitter 104a sends four consecutive period signal after the second receiver 104b receives one consecutive period signal.

In step S104, the controlled device 104 transmits a second high frequency training signal to the first receiver 102b of the host device 102 wherein the frequency of the first low frequency signal and the second low frequency signal is smaller than the frequency of the first high frequency training signal and the second high frequency training signal. The first high frequency training signal and the second high frequency training signal are selected one group consisting of training signal of equalization (TSEQ), the first training sequence 1 (TS1) and the second training sequence 2 (TS2). In one embodiment, the first high frequency training signal and the second high frequency training signal have frequencies which are greater than 1 GHz.

In step S106, the host device 102 and the controlled device 104 complete the handshaking procedure therebetween so that the controlled device 104 is in standby status.

In one embodiment, the first low frequency signal and the second low frequency signal which is compatible to USB 3.0 protocol, PCI-E protocol, and serial encoding and decoding bus protocol. For example, USB 3.0 protocol is SuperSpeed protocol which has an operation frequency of 5 Gbs. The frequencies of the first low frequency signal and the second low frequency signal have a range from 10 MHz to 100 MHz. The first low frequency signal and the second low frequency signal are low frequency periodic signal (LFPS) to be a handshaking communication signal between the controlled device 104 and the host device 102. Moreover, the reference clock device 112 provides reference clock to drive the clock/data recovery device 106 and the serial encoding and decoding device 108 so that the clock/data recovery device 106 can extracts the high frequency signal transmitted from the host device 102 to the controlled device 104 for generating a clock signal and a data signal. The serial encoding and decoding device 108 converts the format of the data signal from the clock/data recovery device 106.

According to the above-mentioned descriptions, the detection method of low frequency handshaking signal utilizes the impedance calibration of the host device 102 and the controlled device 104 for saving the manufacturing cost of the terminal impedance detection circuits of the host device and the controlled device and for increasing the impedance matching compatibility between the host device and the controlled device. Further, in the detection system 100, the host device 102 communicates with the controlled device 104 by low frequency handshaking signal for reducing the power consumption because the low frequency handshaking signal has low frequency.

Figure 2A:
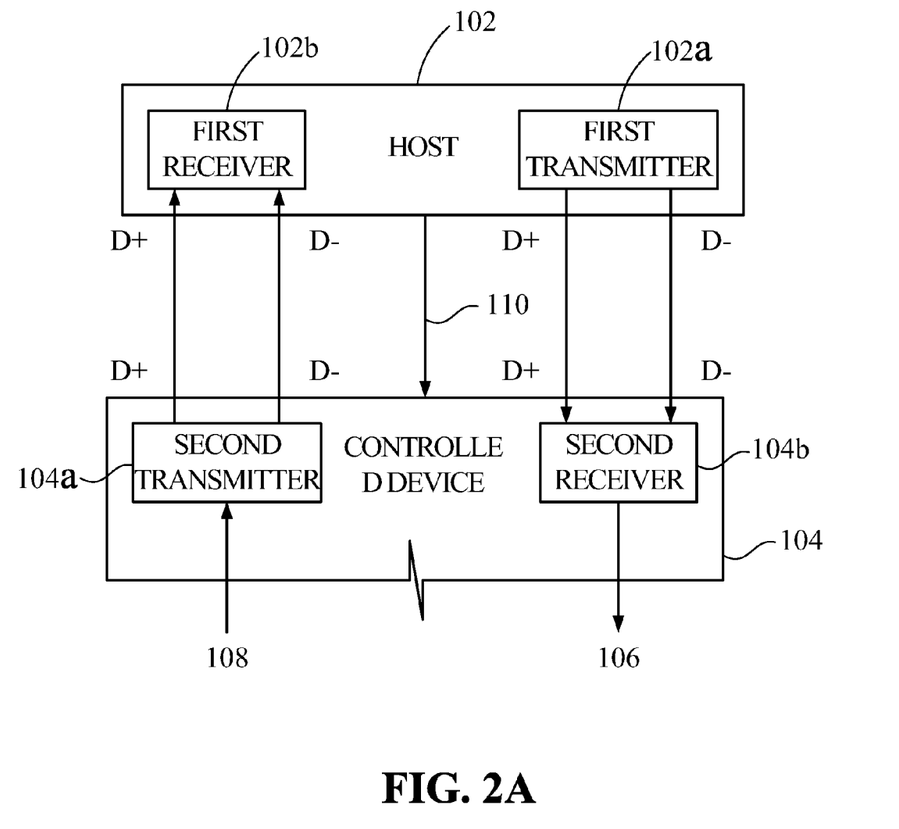
FIG. 2A is a schematic block diagram of detection system of low frequency handshaking signal which is compatible to Universal Serial Bus (USB) protocol shown in FIG. 1A according to a first embodiment of the present invention.
Figure 2B:
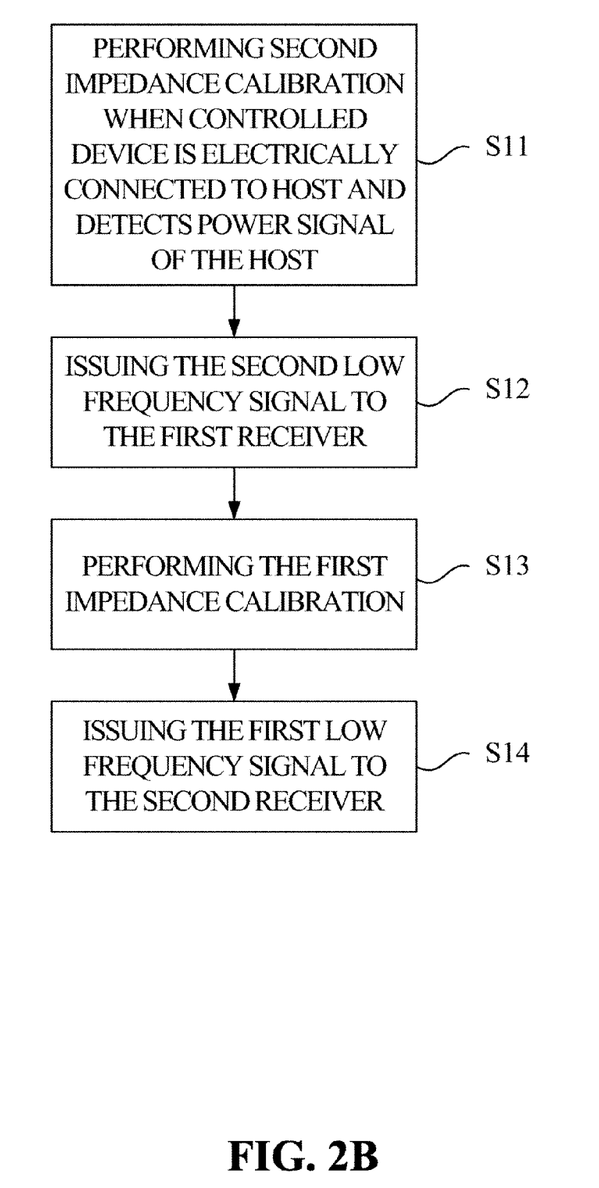
FIG. 2B is one flow chart of detection method of low frequency handshaking signal shown in FIG. 2A according to the first embodiment of the present invention.

Please refer to FIG. 2A and FIG. 2B. FIG. 2A is a schematic block diagram of detection system 100 of low frequency handshaking signal which is compatible to Universal Serial Bus (USB) protocol shown in FIG. 1A according to a first embodiment of the present invention. FIG. 2B is one flow chart of detection method of low frequency handshaking signal shown in FIG. 2A according to the first embodiment of the present invention. As shown in FIG. 1B, the step S100 further includes the following steps of:

In step S11, the second receiver 104b performs the second impedance calibration when the controlled device 104 is electrically connected to the host device 104 and detects a power signal of the host device 102. For example, when the controlled device 104 is inserted into the host 102, the host device 102 provides power to the controlled device 104.

In step S12, the controlled device 104b controls the second transmitter for issuing the second low frequency signal to the first receiver 102b after the second receiver 104b completes the second impedance calibration.

In step S13, the first receiver 102b performs the first impedance calibration after the first receiver 102b detects the second low frequency signal.

In step S14, the host device 102 controls the first transmitter 102a for issuing the first low frequency signal to the second receiver 104b after the first receiver 102b completes the first impedance calibration.

Figure 2C:
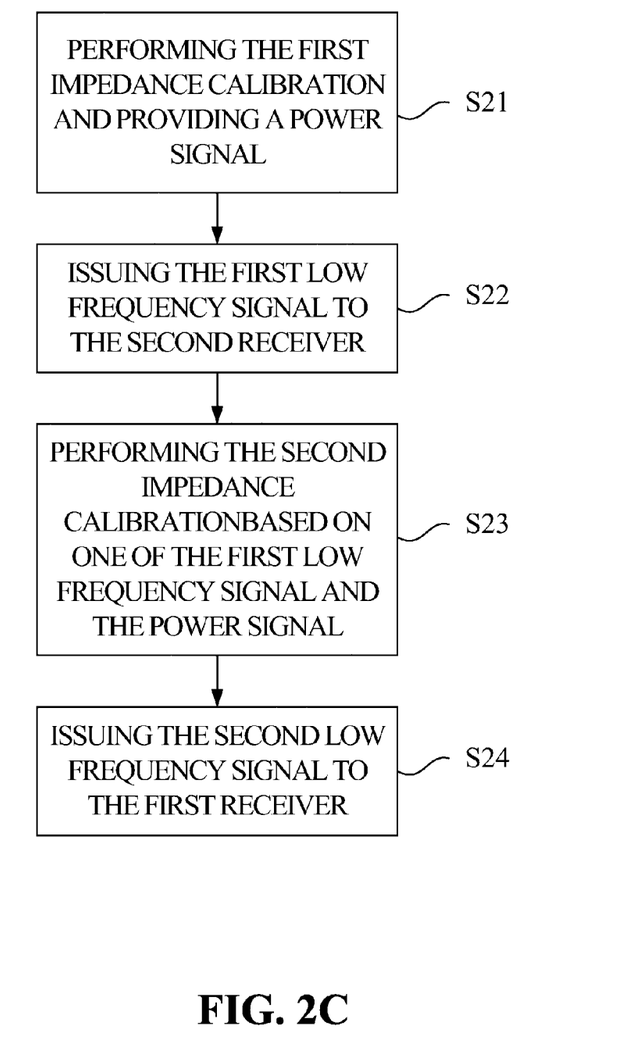
FIG. 2C is another flow chart of detection method of low frequency handshaking signal shown in FIG. 2A according to the first embodiment of the present invention.

Please refer to FIG. 2A and FIG. 2C. FIG. 2C is another flow chart of detection method of low frequency handshaking signal shown in FIG. 2A according to the first embodiment of the present invention. As shown in FIG. 1B, the step S100 further includes the following steps of:

In step S21, performing the first impedance calibration by the first receiver and providing a power signal by the host device when the host device is activated;

In step S22, the host device 102 controls the first transmitter 102a for issuing the first low frequency signal to the second receiver 104b after the first receiver 102b completes the first impedance calibration.

In step S23, the controlled device 104 receives the first low frequency signal and the power signal, and the second receiver is activated for performing the second impedance calibration by the controlled device based on one of the first low frequency signal and the power signal when the controlled device is electrical connected to the host device.

In step S24, the controlled device 102 controls the second transmitter 104b for issuing the second low frequency signal to the first receiver 102b after the second receiver 104b completes the second impedance calibration.

According the above-mentioned descriptions with respect to FIGS. 2A-2C, the detection method of low frequency handshaking signal in the present invention employs the first low frequency and the second low frequency for handshaking communications so as to replace the impedance matching step for saving the manufacturing cost of the terminal impedance detection circuits of the host device and the controlled device. For example, in USB 3.0 SuperSpeed protocol, the impedance matching step during the "Rx Detect" stage can be omitted and the a first low frequency and a second low frequency are transmitted between the host device 102 and the controlled device 104 for saving the manufacturing cost of the terminal impedance detection circuits therebetween.

Figure 3A:
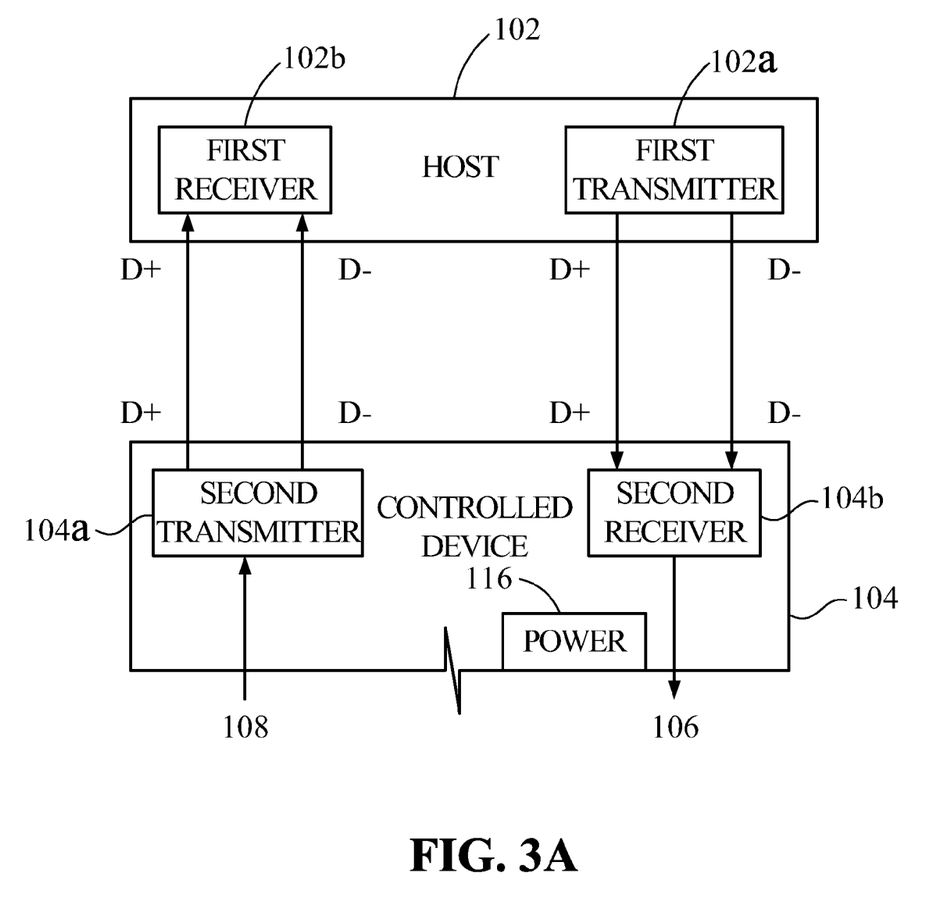
FIG. 3A is a schematic block diagram of detection system of low frequency handshaking signal which is compatible to PCI-E protocol shown in FIG. 1A according to a second embodiment of the present invention.
Figure 3B:
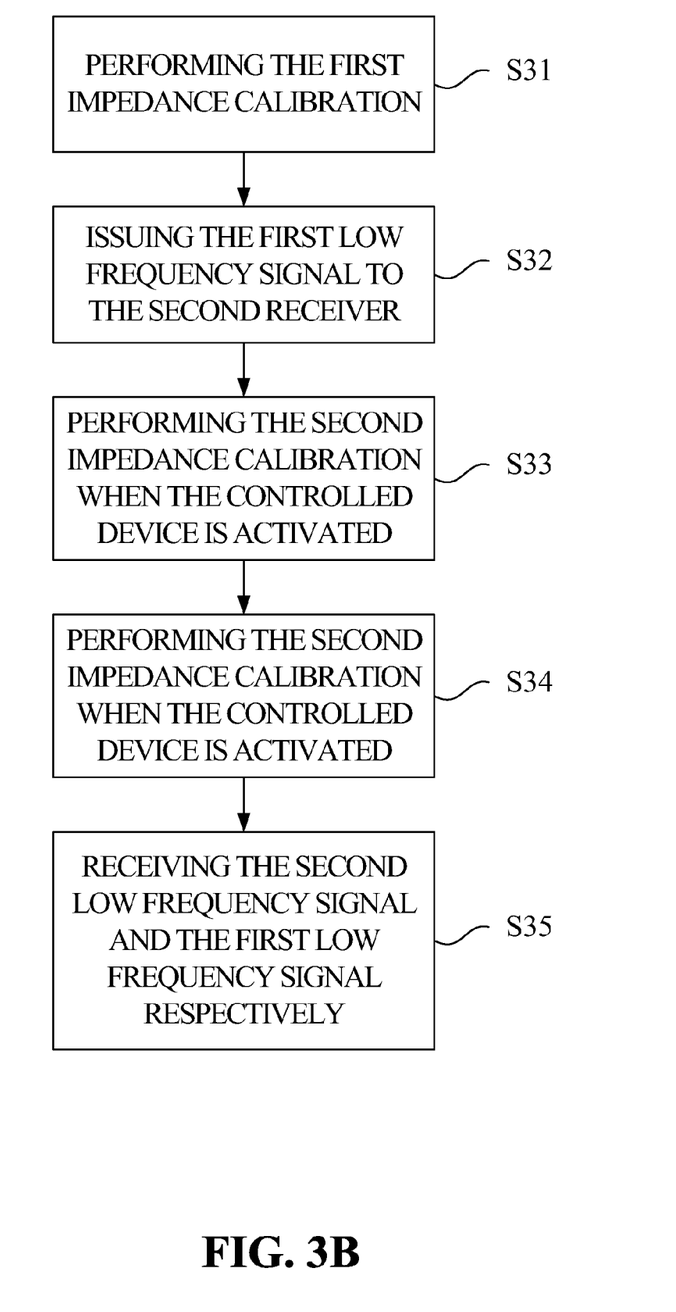
FIG. 3B is one flow chart of detection method of low frequency handshaking signal shown in FIG. 2A according to the second embodiment of the present invention.

Please refer to FIG. 3A and FIG. 3B. FIG. 3A is a schematic block diagram of detection system 100 of low frequency handshaking signal which is compatible to PCI-E protocol shown in FIG. 1A according to a second embodiment of the present invention. FIG. 3B is one flow chart of detection method of low frequency handshaking signal shown in FIG. 2A according to the second embodiment of the present invention. The detection system 100 in FIG. 3A is similar to the detection system 100 in FIG. 2A. The difference between FIG. 3A and FIG. 2A is that the power signal bus 110 between the host device 102 and the controlled device 104 is omitted. Alternatively, a power 116 is positioned in the controlled device 104 for providing the power to the controlled device 104 for activating the controlled device 104. As shown in FIG. 1B, the step S100 further includes the following steps of:

In step S31, the first receiver 102b performs the first impedance calibration when the host device 102 is activated.

In step S32, the host device 102 controls the first transmitter for issuing the first low frequency signal to the second receiver 104b after the first receiver 102b completes the first impedance calibration.

In step S33, the second receiver 104b performs the second impedance calibration when the controlled device 104 is activated.

In step S34, the controlled device 104 controls the second transmitter 104a for issuing the second low frequency signal to the first receiver 102b after the second receiver 104b completes the second impedance calibration.

In step S35, the host device 102 and the controlled device 104 receives the second low frequency signal and the first low frequency signal respectively when the controlled device 104 is electrical connected to the host device 102.

Conventionally, the transmitter and receiver of the host device and the controlled device have the compatibility problem and the terminal impedance detection circuits are too complicated. As depicted in FIG. 2B, FIG. 2C and FIG. 3B, the detection method of low frequency handshaking signal only identifies whether the receivers of the host device and the controlled device themselves and then the low frequency handshaking signal can be transmitted. In other words, it not necessary to identify whether the opposite receivers of the host device and the controlled device are ready for operation. Specifically, it is not required that the first transmitter 102a of the host device 102 is matched with the second receiver 104b of the controlled device 104, and it is not required that the second transmitter 104a of the controlled device 104 is matched with the first receiver 102b of the host device 102 so that the low frequency handshaking signal can be transmitted. Therefore, the detection system 100 can solves the problem of impedance matching compatibility between the host device 102 and the controlled device 104. That is, if the impedance matching value of the controlled device 104 is not the same as a standard impedance matching value, e.g. 45 Ohms, the high frequency training signal still can be transmitted. Even if the impedance matching step during the "Rx Detect" stage can be omitted, impedance matching step can be performed during the transmission stage of high frequency training signal so that operation of the detection system 100 does not be effected. Further, the manufacturing cost of the terminal impedance detection circuits of the host device and the controlled device can be saved.

Based on the above descriptions, the detection method is capable of saving the manufacturing cost of the terminal impedance detection circuits of the host device and the controlled device, increasing the impedance matching compatibility between the host device and the controlled device, and reducing the power consumption when the host device communicates with the controlled device by low frequency handshaking signal.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A detection method of low frequency handshaking signal which is suitable for a detection system, wherein the detection system comprises a host device having a first receiver and a first transmitter, and a controlled device having a second receiver, a second transmitter and a clock/data recovery device, the detection method comprising the steps of:
- (a) performing a first impedance calibration when the host device is activated for sending a first low frequency signal based on the first impedance calibration and performing a second impedance calibration when the controlled device is activated for sending a second low frequency signal based on the second impedance calibration;
- (b) transmitting a first high frequency training signal from the host device to the second receiver of the controlled device when the first low frequency signal and the second low frequency signal are in a predetermined condition; and
- (c) transmitting a second high frequency training signal from the controlled device to the first receiver of the host device wherein the frequency of the first low frequency signal and the second low frequency signal is smaller than the frequency of the first high frequency training signal and the second high frequency training signal.

2. The detection method of claim 1, wherein the first impedance calibration is independent of the second impedance calibration during the step (a).

3. The detection method of claim 1, during the step (a), further comprising the steps of:
- (a11) performing the second impedance calibration by the second receiver when the controlled device is electrically connected to the host device and detects a power signal of the host device;
- (a12) controlling the second transmitter by the controlled device for issuing the second low frequency signal to the first receiver after the second receiver completes the second impedance calibration;
- (a13) performing the first impedance calibration by the first receiver after the first receiver detects the second low frequency signal; and
- (a14) controlling the first transmitter by the host device for issuing the first low frequency signal to the second receiver after the first receiver completes the first impedance calibration.

4. The detection method of claim 1, during the step (a), further comprising the steps of:
- (a21) performing the first impedance calibration by the first receiver and providing a power signal by the host device when the host device is activated;
- (a22) controlling the first transmitter by the host device for issuing the first low frequency signal to the second receiver after the first receiver completes the first impedance calibration;
- (a23) receiving the first low frequency signal and the power signal by the controlled device, and activating the second receiver for performing the second impedance calibration by the controlled device based on one of the first low frequency signal and the power signal when the controlled device is electrically connected to the host device; and
- (a24) controlling the second transmitter by the controlled device for issuing the second low frequency signal to the first receiver after the second receiver completes the second impedance calibration.

5. The detection method of claim 1, during the step (a), further comprising the steps of:
- (a31) performing the first impedance calibration by the first receiver when the host device is activated;
- (a32) controlling the first transmitter by the host device for issuing the first low frequency signal to the second receiver after the first receiver completes the first impedance calibration;
- (a33) performing the second impedance calibration by the second receiver when the controlled device is activated;
- (a34) controlling the second transmitter by the controlled device for issuing the second low frequency signal to the first receiver after the second receiver completes the second impedance calibration; and
- (a35) receiving the second low frequency signal and the first low frequency signal respectively by the host device and the controlled device when the controlled device is electrically connected to the host device.

6. The detection method of claim 1, wherein the first low frequency signal and the second low frequency signal which are compatible to USB 3.0 protocol.

7. The detection method of claim 1, wherein the first low frequency signal and the second low frequency signal which are compatible to PCI-E protocol.

8. The detection method of claim 1, wherein the first low frequency signal and the second low frequency signal which are compatible to a serial encoding and decoding bus protocol.

9. The detection method of claim 1, wherein the frequencies of the first low frequency signal and the second low frequency signal have a range from 10 MHz to 100 MHz.

10. The detection method of claim 1, wherein the first low frequency signal and the second low frequency signal are periodical signals having low frequency, respectively.

11. The detection method of claim 1, wherein the first high frequency training signal and the second high frequency training signal have frequencies which are greater than 1 GHz.

* * * * *